June 11, 1968  KARL-GEORG GÜNTHER  3,387,476

METHOD AND DEVICE FOR FORMING WORKPIECES ELECTRODYNAMICALLY

Filed Oct. 28, 1965

United States Patent Office 3,387,476
Patented June 11, 1968

3,387,476
METHOD AND DEVICE FOR FORMING WORK-
PIECES ELECTRODYNAMICALLY
Karl-Georg Günther, Boxdorf, Germany, assignor to
Siemens Aktiengesellschaft, Berlin, Germany, a
corporation of Germany
Filed Oct. 28, 1965, Ser. No. 505,528
Claims priority, application Germany, Apr. 12, 1965,
S 96,486
10 Claims. (Cl. 72—56)

ABSTRACT OF THE DISCLOSURE

The electrodynamic method of forming workpieces includes surrounding the workpiece by concentric bifilar and mutually insulated windings, passing high power current surges in mutually opposed directions through the respective windings for producing mutually repulsive dynamic forces between the windings, and passing the dynamic forces through coupling material placed between the workpiece and the windings so as to act formingly upon the workpiece.

Figure 1:
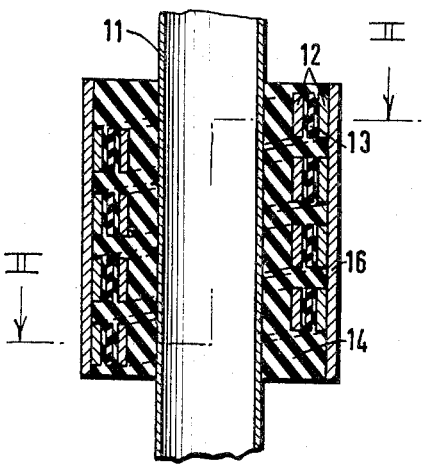

Device for carrying out the method includes concentric bifilar and mutually insulated windings, a quantity of coupling material which forms a hollow-cylindrical coupling structure and in which the windings are coaxially embedded, the coupling structure being adapted to closely surround the workpiece to be formed, the windings being serially interconnected and having terminal means to pass high power current surges in mutually opposed directions through the respective windings for causing the resulting mutually repulsive forces in the windings to act through the coupling material formingly upon the workpiece.

My invention relates to method and means for forming and similarly fabricating solid workpieces.

During the recent past there have been developed new methods of metal forming which afford a greatly higher forming speed than the conventional mechanical fabricating methods. In many cases these high-speed forming methods have also permitted simplifying and improving various manufacturing operations, and it has become possible to apply forming processes to materials which in the conventional manner can be worked only with difficulty. Among the high-speed forming methods are the explosive forming technique, the hydrospark method and the magnetic-pulse forming method.

The magnetic-pulse forming method, known for example from U.S. Patent 2,976,907, operates with work coils acting as compression coils, expansion coils or flat (drawing) coils. According to this method, a rapidly varying current, such as a shock discharge from a capacitor, is passed through a primary coil, namely the work coil, which induces corresponding currents in the workpiece and thereby causes forces which effect the desired deformation of the workpiece. This method is limited to metallic, electrically good conducting workpiece materials.

Another method of forming metallic workpieces with the aid of high-intensity magnetic fields produced by means of a work coil is described in the copending application of H. Schenk, Ser. No. 462,280, filed June 8, 1965, and assigned to the assignee of the present invention. With this method, the magnetic field produced by means of the work coil is applied to a mechanically stable medium of high electrical conductance located close to the work coil, so that this medium produces a mechanical shock wave in an incompressible intermediate medium which, in turn imposes a corresponding fabricating pressure upon a workpiece. With this method, therefore, the secondary current is not induced in the workpiece itself but in an electrically good conducting component from which the shock wave is transmitted through an incompressible medium onto the workpiece, which in this case may be either electrically conducting or non-conducting.

It is an object of my invention to devise a method and means suitable for high-pressure forming of workpieces of conducting or non-conducting material which affords a considerable shortening of the energy transmitting path, a reduction in power losses, and also a simple adaptability to the particular workpiece or body to be subjected to the forming operation.

To achieve these objects and in accordance with my invention, I provide a method and means which effect the forming of the solid workpiece by electrodynamical means not making use of secondary (eddy) currents, thus doing away with any interposed force-producing medium or structure and readily permitting a shaping and analogously fabricating of workpieces which are either electrical conductors or non-conducting.

According to more specific features of my invention, I surround the workpiece by one or more concentrical and mutually insulated double windings of an electrical conductor essentially constituting an electrically bifilar coil whose turns, when a high-intensity electrical current passes through the conductor, are traversed by the current in mutually opposed sense, thus producing high-intensity repulsive dynamic forces between the correlated winding turns. I further dispose between the workpiece and the double windings a coupling material which transmits the repulsive forces onto the workpiece. That is, the forces produced by the mutually rejective current paths in the bifilar turns of the winding then act through the coupling material to effect the desired forming of the workpiece.

Suitable as coupling materials are rubber or similar elastomer materials, for example rubber rings, rubber sleeves, or also foam materials. Also suitable are liquids, for example water.

The high-intensity currents required for the purpose of the invention are power currents having an intensity of at least 50 kiloamps approximately. In practice, the electrical energy is preferably taken from a shock-current capacitor. The capacitor is charged from a suitable source of high direct voltage in the manner known from the magnetic-pulse forming method as described in the above-mentioned patent. By abruptly switching the charged capacitor onto the above-mentioned bifilar coil, a shock current is passed through the coil turns, having a steep wave front. The shock wave then causes the inner turns of the bifilar windings to be subjected to a powerful displacement force, and the resulting mechanical shock wave passes through the coupling material to the workpiece. A further force effect, occurring during the more gradual decay of the current pulse, may then also be utilized to furnish forming work, particularly if the inner winding turns are made flexible.

It is therefore particularly favorable to have the concentrical double windings provided with flexible inner winding turns, for example of copper braid or litz wire. This affords taking advantage not only of the shock wave proper but also of the more prolonged radial movement of the inner winding portion and the coupling material.

An essential advantage of the method according to the invention resides in a considerable shortening of the energy transfer distance due to the fact that the resulting forces of repulsion produced between components of the work coil itself are caused to directly act in the radial direction upon the workpiece to be formed. This is also the reason for the observed reduction in power losses and consequently an increased efficiency of operation. The method and the corresponding device according to the invention are nevertheless adaptable to various shapes and sizes of the workpiece in a simple manner and, as mentioned, are not limited to any particular workpiece material.

The invention will be further elucidated with reference to the accompanying drawing showing by way of example an embodiment of an electrodynamic forming device according to the invention.

Figure 2:
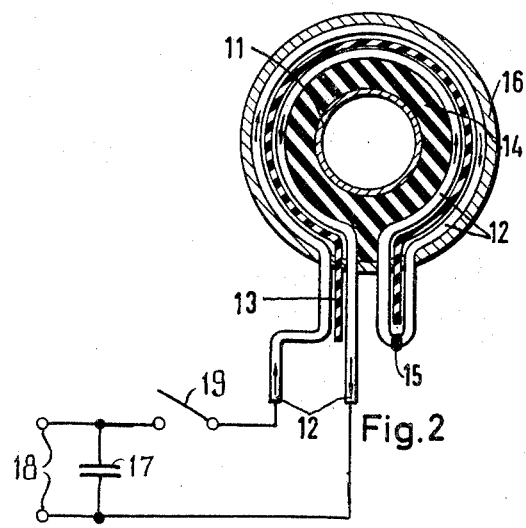

FIG. 1 shows a device designed for compression of a tubular workpiece as desired for producing a constriction in the workpiece or for joining two tubular ends; and FIG. 2 shows a cross section taken approximately along two axially spaced radial planes as indicated by the line II—II in FIG. 1.

On the drawing, a cylindrical workpiece 11 is shown coaxially surrounded by concentrical double windings 12 which are formed essentially by two coaxial helices of bifilar conductors having peripherally outer turns and adjacent inner turns. The outer turns are electrically insulated from the inner turns by an intermediate tape 13 of insulating material. Both helices are embedded in a hollow-cylindrical body 14 of coupling material such as rubber.

The device has a rigid housing 16 which is contacted by the outer turns of the bifilar winding thus bracing the outer turns against displacement in the radially outward direction. The adjacent upper ends of the two winding helices as well as the adjacent lower ends extend through the peripheral wall of the housing 16 to the outside. Two mutually adjacent ends are joined with each other at 15, whereas the other ends are available for passing current surges serially through the two helices.

Shown in FIG. 2 is a shock current capacitor 17 which is charged at terminals 18 from a high-voltage source. Closing of an electronic or spark-gap switch 19, shown only schematically, causes a shock discharge current to pass through the concentric double windings. The resultant forces between the mutually repulsive current paths in the double windings, causing the inner turns to be forced radially inwardly, are transmitted as a mechanical shock wave through the coupling sleeve 14 onto the tubular workpiece 11. The longitudinal range of the tubular body surrounded by the concentric double windings and/or in contact with the coupling material is compressed by the mechanical shock wave.

Upon a study of this disclosure it will be obvious to those skilled in the art that, with respect to design and shape of the device, my invention permits of a great variety of modifications in a manner analogous to the above-mentioned known other high-speed forming methods and devices, and hence may be given embodiments other than particularly illustrated and described herein, without departing from the essential features of my invention and within the scope of the claims annexed hereto.

I claim:

1. The electrodynamic method of forming workpieces, which comprises surrounding the workpiece by concentric bifilar and mutually insulated windings, passing high power current surges in mutually opposed directions through said respective windings for producing mutually repulsive dynamic forces between the windings, and passing the dynamic forces through coupling material placed between the workpiece and the windings so as to act formingly upon the workpiece.

2. The electrodynamic forming method according to claim 1, which comprises rigidly securing the outer windings in a fixed position whereby mainly the inner winding is caused to move due to said repulsive forces.

3. The electrodynamic forming method according to claim 2, wherein the inner windings are formed of flexible material.

4. The electrodynamic forming method according to claim 2, wherein the inner windings are formed of copper braid.

5. The electrodynamic forming method according to claim 1, wherein the coupling material is an elastomer substance.

6. The electrodynamic forming method according to claim 1, wherein the coupling material is water.

7. A device for the elctrodynamic forming of workpieces, comprising concentric bifilar and mutally insulated windings, a quantity of coupling material which forms a hollow-cylindrical coupling structure and in which said windings are coaxially embedded, said coupling structure being adapted to closely surround the workpiece to be formed, said windings being serially interconnected and having terminal means to pass high power current surges in mutually opposed directions through said respective windings for causing the resulting mutually repulsive forces in the windings to act through the coupling material formingly upon the workpiece.

8. An electrodynamic forming device according to claim 7, comprising a rigid enclosure surrounding said windings and said coupling material, said bifilar windings having outer turns mechanically braced against said enclosure around the winding periphery so as to be fixed relative to said enclosure, and said windings having inner turns displaceable by said forces.

9. In an electrodynamic forming device according to claim 7, said outer turns forming a first helix, said inner turns forming a second helix substantially parallel to said first helix, and said coupling structure consisting of a substantially hollow cylindrical body of elastomer material in which said two helices are coaxially embedded.

10. In an electrodynamic forming device according to claim 9, each of said two helices having two ends extending laterally through said enclosure to the outside, two mutually adjacent ends of said respective helices being joined with each other, and the remaining two ends forming exteriorly accessible extermities for serially passing shock current through said two helices.

References Cited
UNITED STATES PATENTS 3,210,842 10/1965 Schwinghamer _____ 72—56
3,279,228 10/1966 Brower _____ 72—56

RICHARD J. HERBST, *Primary Examiner.*